(12) United States Patent
Roh et al.

(10) Patent No.: US 9,100,471 B2
(45) Date of Patent: Aug. 4, 2015

(54) METHOD AND DEVICE OF INPUT FOR A PORTABLE TERMINAL

(75) Inventors: Yonng-Gil Roh, Gyeonggi-do (KR); Sung-Won Jeon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1005 days.

(21) Appl. No.: 12/698,234

(22) Filed: Feb. 2, 2010

(65) Prior Publication Data
US 2010/0193342 A1 Aug. 5, 2010

(30) Foreign Application Priority Data
Feb. 2, 2009 (KR) .................... 10-2009-0007950

(51) Int. Cl.
*B23K 11/24* (2006.01)
*H04M 1/23* (2006.01)
*H01H 13/702* (2006.01)
*H01H 25/04* (2006.01)
*H04M 1/725* (2006.01)

(52) U.S. Cl.
CPC ....... *H04M 1/23* (2013.01); *G06F 2203/04105* (2013.01); *H01H 13/702* (2013.01); *H01H 25/041* (2013.01); *H01H 2209/082* (2013.01); *H01H 2215/012* (2013.01); *H01H 2217/016* (2013.01); *H01H 2221/05* (2013.01); *H04M 1/7258* (2013.01); *H04M 2250/12* (2013.01)

(58) Field of Classification Search
CPC ....................................................... H04M 1/23
USPC .................... 345/173; 200/5 A; 341/27, 34
See application file for complete search history.

(56) References Cited

U.S. PATENT DOCUMENTS

| 7,123,241 B2 * | 10/2006 | Bathiche ..................... 345/168 |
| 8,203,640 B2 * | 6/2012 | Kim et al. ................. 348/333.12 |
| 2005/0174260 A1 * | 8/2005 | Arneson et al. ................. 341/34 |
| 2007/0184877 A1 * | 8/2007 | In et al. ......................... 455/565 |
| 2009/0289904 A1 * | 11/2009 | Park et al. ..................... 345/173 |
| 2010/0148999 A1 * | 6/2010 | Casparian et al. .............. 341/34 |

FOREIGN PATENT DOCUMENTS

| JP | 2007-214129 A | 8/2007 |
| KR | 10-2006-0131839 A | 12/2006 |

* cited by examiner

*Primary Examiner* — Daniel Cavallari
(74) *Attorney, Agent, or Firm* — Cha & Reiter, LLC

(57) ABSTRACT

A portable terminal includes an input device and processing hardware which operates a predetermined method. The input device includes a keypad unit consisting of a plurality of key buttons, a board consisting of a plurality of pressure sensors and dome switches for generating signals when pressed, and an actuator for simultaneously pressing the corresponding dome switch and the corresponding pressure sensor when a key button is pressed, with the processing hardware for performing and finishing a first operation based on the signal generated by the corresponding dome switch if generation of the signal generated by the dome switch stops before a valid time has expired, and for performing a second operation based on a pressure change sensed by the corresponding pressure sensor simultaneously pressed until the generation of the signal generated by the corresponding dome switch remains after the valid time has expired.

8 Claims, 5 Drawing Sheets

METHOD AND DEVICE OF INPUT FOR A PORTABLE TERMINAL

CLAIM OF PRIORITY

This application claims the benefit of the earlier filing date, under 35 U.S.C. §119, of that patent application, entitled "THE METHOD AND DEVICE OF INPUT FOR PORTABLE TERMINAL", filed in the Korean Intellectual Property Office on Feb. 2, 2009 and afforded Serial No. 10-2009-0007950, the contents of which are incorporated by reference in its entirety, herein.

BACKGROUND OF THE INVENTION

1. Field of the Invention

The present invention relates to the field of portable terminals and more particularly, to a method and device of providing mechanical and software inputs to the portable terminal.

2. Description of the Related Art

With the development of electronic communication industries in recent years, portable terminals light in weight, thin in thickness, and small in size are becoming a trend and functions thereof are being diversified. For example, a terminal may include a speaker device capable of realizing polyphony melodies or may include a mega-pixel color display device. In addition to providing various game content using the speaker device and a display device, the portable terminal provides various multimedia functions such as an MPeg-1 audio layer 3 (MP3) play function, a radio function, a Digital Multimedia Broadcasting (DMB) function, etc. Therefore, a key signal input device is more frequently used in the portable terminal to perform such various multimedia functions, and thus the key signal input device is considered an important constitutional element of the terminal.

A conventional portable terminal has a key signal input device which includes a contact pattern on a main board and a dome switch for allowing an electrical contact to be made with the contact pattern is pressed. When the dome switch is pressed, a contact is made with the contact pattern, and the portable terminal handles this as if a specific key signal has been input.

The conventional portable terminal also includes another input device which has a plurality of pressure sensors on a main board to output a signal in response to sensing a pressure change. When a signal is generated by the pressure sensor due to the pressure change, the portable terminal handles the signal as an input signal of a specific key.

The input device using the dome switch provides a user with a mechanical click feel, and thus the user can feel conformable in the use of the input device. In addition, the input device using the pressure sensor can configure various key signals depending on a pressure change. On the other hand, the input device using the dome switch has a limitation in configuring the various key signals of the input device. Further, the input device using the pressure sensor is inferior to the input device using the dome switch in terms of providing the mechanical click feel.

SUMMARY OF THE INVENTION

An exemplary aspect of the present invention is to provide a method and input device for a portable terminal capable of generating various key signals by combining at least two devices for generating an input signal.

Another exemplary aspect of the present invention is to provide a method and input device for a portable terminal by combining a dome switch and a pressure sensor so as to provide the user with a mechanical click feel when using the dome switch and for configuring various key signals for respective pressure magnitudes of the pressure sensor.

In accordance with an exemplary aspect of the present invention, a portable terminal is provided, with the portable terminal including an input device and processing hardware which operates a predetermined method. The input device includes a keypad unit consisting of a plurality of key buttons, a board consisting of a pressure sensor and a dome switch for generating a signal when pressed, and an actuator for simultaneously pressing the dome switch and the pressure sensor when a corresponding key button of the keypad unit is pressed, with the processing hardware for performing and finishing a first operation based on the signal generated by the dome switch if generation of the signal generated by the dome switch stops before a valid time period expires and for performing a second operation based on a pressure change sensed by the pressure sensors simultaneously pressed until the generation of the signal generated by the dome switch stops after the valid time period expires.

In accordance with another exemplary aspect of the present invention, a portable terminal is provided, with the portable terminal including an input device and processing hardware which operates a predetermined method. The input device includes a keypad unit consisting of a plurality of key buttons, a board consisting of a dome switch for generating a signal when pressed and at least one pair of pressure sensors disposed around the dome switch, and an actuator for pressing the dome switch when a corresponding key button of the keypad is pressed and thereafter for simultaneously pressing one pair of corresponding pressure sensors, with the processing hardware for performing a first operation based on a signal generated by the dome switch if a pressure difference between the pressed one pair of pressure sensors is within a reference range, and for performing a second operation based on a signal generated by a pressure sensor pressed with relatively greater pressure if the pressure difference between the pressed one pair of pressure sensors is beyond the reference range.

In accordance with still another exemplary aspect of the present invention, an input method of a portable terminal including a keypad unit consisting of a plurality of key buttons, a board consisting of a pressure sensor and a dome switch for generating a signal when pressed, and an actuator for simultaneously pressing the dome switch and the pressure sensor when a specific key button of the keypad unit is pressed is provided. The method includes performing and finishing a first operation based on the signal generated by the dome switch when generation of the dome switch signal stops before a valid time has expired, and performing a second operation based on a pressure change sensed by corresponding pressure sensors simultaneously pressed after the valid time has expired.

In accordance with another exemplary aspect of the present invention, an input method of a portable terminal including a keypad unit consisting of a plurality of key buttons, a board consisting of a dome switch for generating a signal when pressed and at least one pair of pressure sensors disposed around the dome switch, and an actuator for pressing the dome switch when a corresponding key button of the keypad is pressed and thereafter for simultaneously pressing one pair of corresponding pressure sensors is provided. The method includes determining whether a pressure difference between the one pair of specific sensors simultaneously pressed after the dome switch is pressed is beyond a reference range, performing a first operation based on the signal generated by the dome switch if the pressure difference between the pressed one pair of pressure sensors is within the reference range, and performing a second operation based on a signal generated by a pressure sensor pressed with relatively greater pressure if the pressure difference between the pressed one pair of pressure sensors is beyond the reference range.

Other exemplary aspects, advantages and salient features of the invention will become more apparent to those skilled in the art from the following detailed description, which, taken in conjunction with the annexed drawings, discloses exemplary embodiments of the invention in more detail.

BRIEF DESCRIPTION OF THE DRAWINGS

The above features and advantages of certain exemplary embodiments of the present invention will be more apparent from the following detailed description taken in conjunction with the accompanying drawings, in which.

DETAILED DESCRIPTION OF THE INVENTION

The following description, with reference to the accompanying drawings, is provided to assist a person of ordinary skill in the art with a comprehensive understanding of exemplary embodiments of the invention. The description includes various specific details to assist in that understanding but these details are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness so as not to obscure appreciation of the present invention by a person of ordinary skill with such well-known functions and constructions.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims.

It is to be understood that the singular forms "a", "an", and "the" include plural references unless the context clearly dictates otherwise. Thus, for example, reference to "a component surface" typically includes reference to one or more of such surfaces.

By the term "substantially" typically means that the recited characteristic, parameter, or value need not be achieved exactly, but that deviations or variations, including for example, tolerances, measurement error, measurement accuracy limitations and other factors known to those skilled in the art, and may occur in amounts that do not preclude the effect the characteristic was intended to provide.

Preferred embodiments of the present invention will be described below with reference to the accompanying drawings.

The present invention will be described by applying a structure of the present invention to a bar-type portable wireless terminal of FIG. 1. However, the present invention is not limited thereto, and thus can also apply to other types (e.g., a folder type, a slide type, etc.) of portable wireless terminals without departing from the scope of the present invention.

Figure 1:
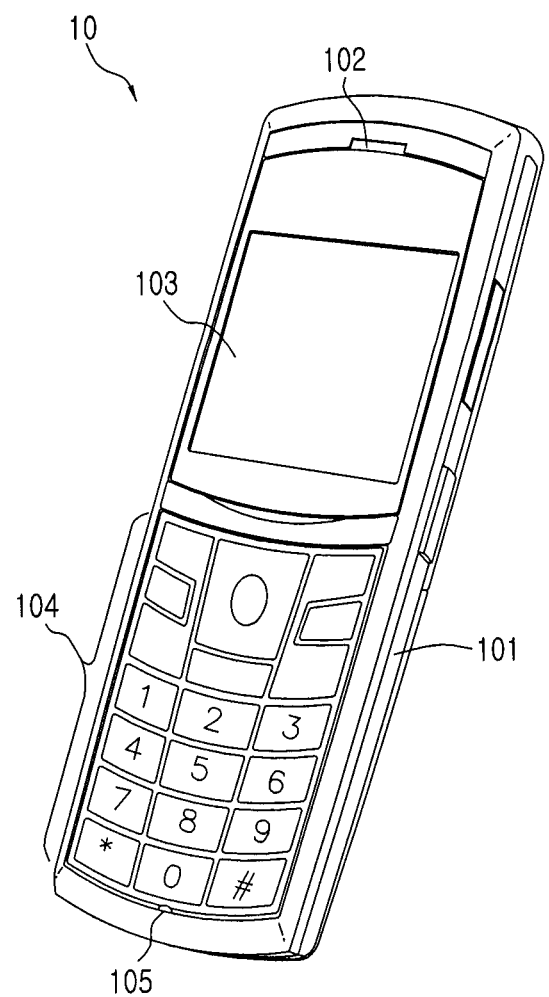
FIG. 1 is a perspective view illustrating a portable wireless terminal according to an exemplary embodiment of the present invention.

FIG. 1 is a perspective view illustrating a portable wireless terminal according to an exemplary embodiment of the present invention.

Referring now to FIG. 1, a portable wireless terminal includes a case frame defining an outer surface. Constitutional elements described below are equipped in the case frame (or body) 101.

Figure 3:
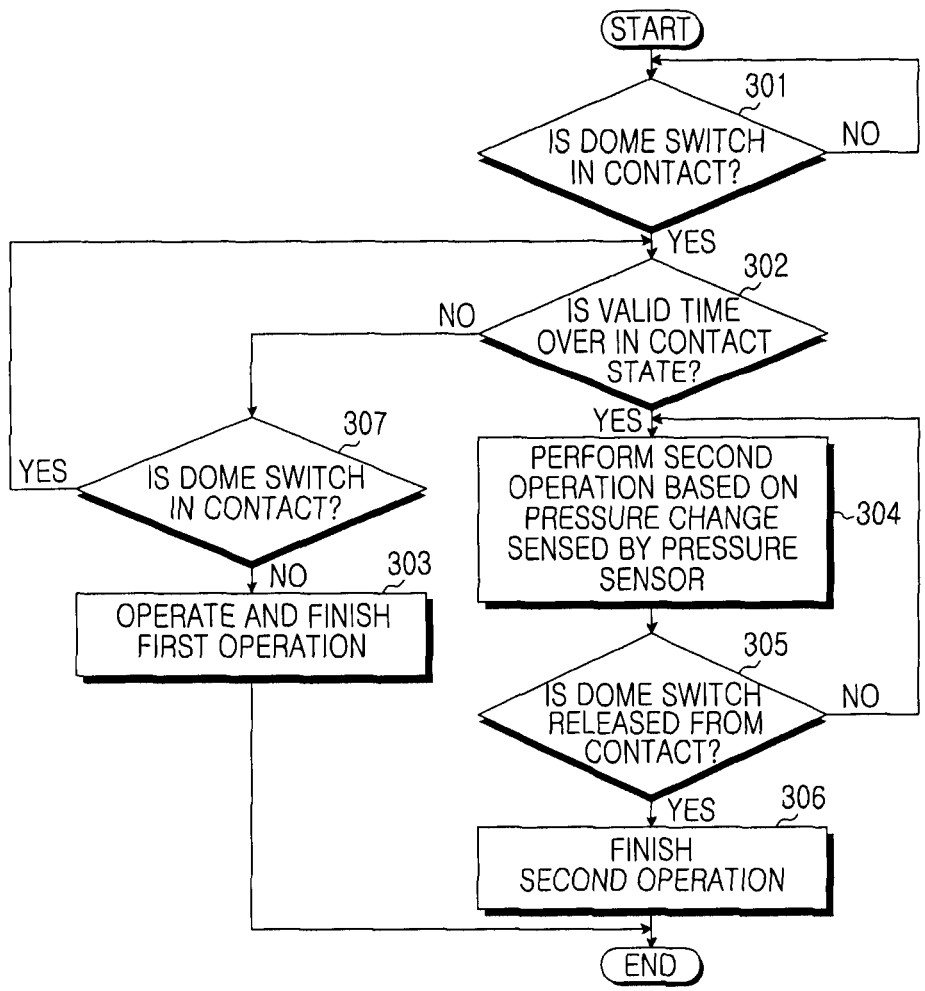
FIG. 3 is a flowchart illustrating a key operation of a key assembly of FIG. 2.
Figure 4:
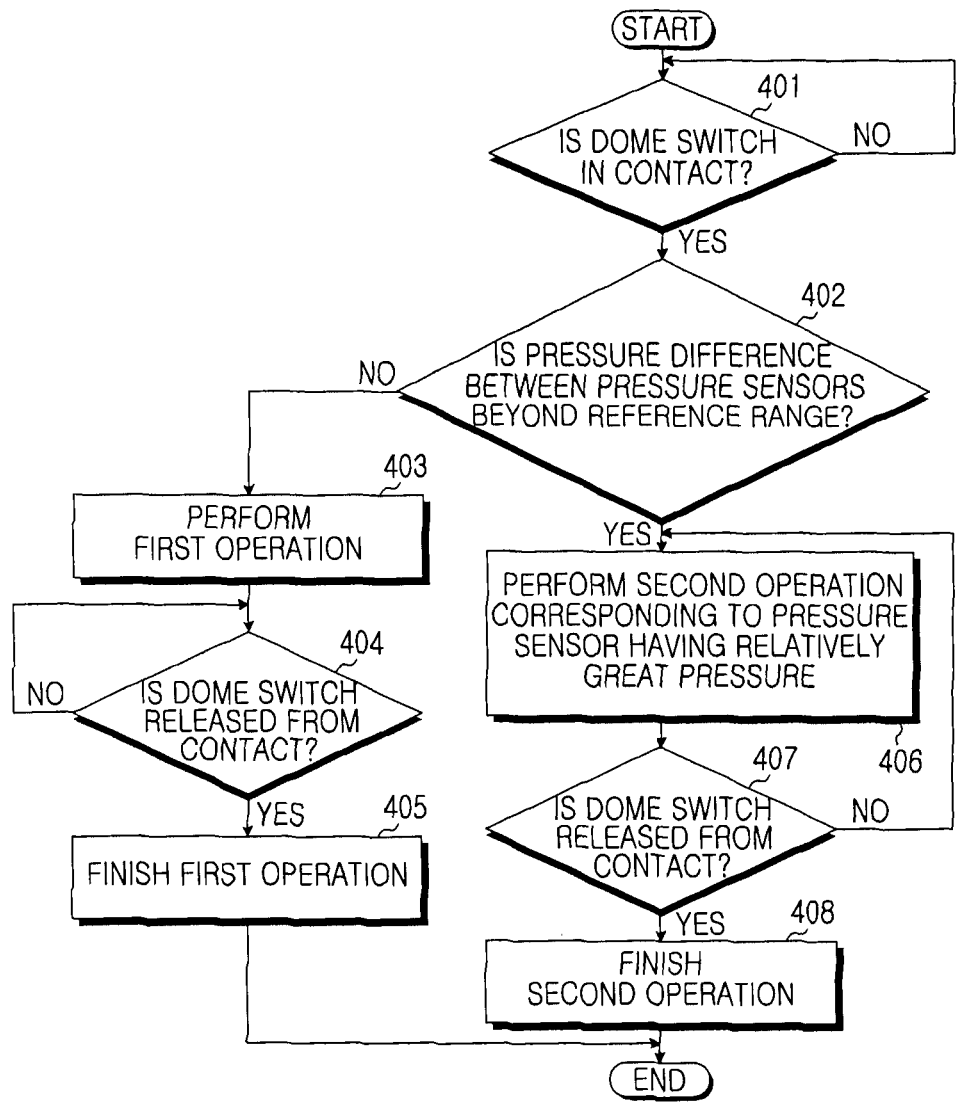
FIG. 4 is a flowchart illustrating another key operation of a key assembly of FIG. 2.

The portable mobile terminal 10 includes a speakerphone that outputs a voice signal and a display that is disposed near the speakerphone to output a video signal. Further, the portable mobile terminal 10 includes a key assembly 104 that is a data input element and a microphone that is disposed near the key assembly 104 to input the voice signal. The display may comprise, for example, a Liquid Crystal Display (LCD) with millions of pixels. In a case where a touch screen function is provided the LCD, the display may function as the data input unit in place of the keypad assembly or as auxiliary unit. The portable mobile terminal 10 includes processing hardware for operating a predetermined method as shown in FIGS. 3-4.

In particular, the key assembly 104 (and/or the LCD having a touch screen function) of the present invention combines a dome switch and a pressure sensor to provide a mechanical "click feel" based on the dome switch and to provide a key signal for allowing various operations depending on a pressure change sensed by the pressure sensor. A click feel is a feature that is referred to in the art for providing a positive indication to a user that a specific key has been depressed.

For example, when a user presses a specific key, the dome switch and the pressure sensor are pressed by a corresponding actuator. The pressed dome switch comes in contact with an electrical contact pattern. When the contact is sensed, the processing hardware, which controls an overall operation of the terminal, handles the indication of depression, as a specific key signal input. If the dome switch is in contact, for a period of time greater than a valid time specific function based on the pressure change sensed by the pressure sensor is performed. The function may be a scrolling function, for example, having a variable speed depending on a sensed pressure change. If the user releases their hand from the key before the valid time period is over (has expired), a function depending on the input signal of the dome switch, for example, one scrolling operation, may be performed.

Figure 2:
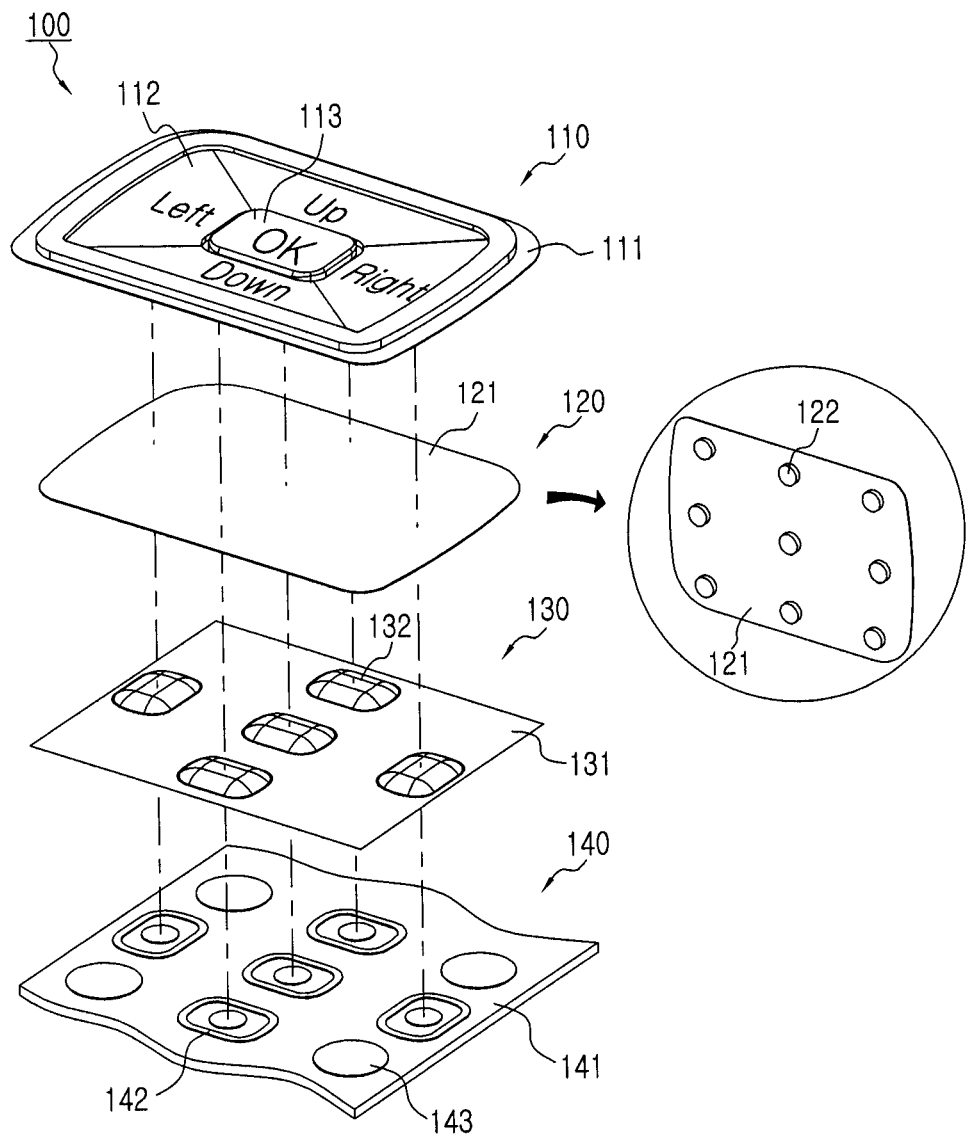
FIG. 2 is an exploded perspective view illustrating a key assembly according to an exemplary embodiment of the present invention.

FIG. 2 is an exploded perspective view illustrating a key assembly according to an exemplary embodiment of the present invention.

Referring now to FIG. 2, the key assembly 104 shown in FIG. 1 is implemented by a key assembly 100 shown in FIG. 2 which includes a keypad unit 110, a pressure sheet 120, a dome sheet 130, and a board 140.

The keypad unit 110 is supported by a case frame 101 (see FIG. 1) of a portable terminal (not shown) and defines an outer surface. The keypad unit 110 includes a plurality of keys. According to the exemplary embodiment of the present invention, the keypad unit 110 includes an integrated-type first key button unit 112 and a second key button unit 113 separated from the first key button unit 112. For example, as shown in FIG. 2, the first key button unit 112 may be a direction key indicating 4 directions, and the second key button unit 113 may be a selection key surrounded by the direction keys 112. In addition, the keypad unit 110 may include a separation-preventing flange 111 that prevents keys from separating from the case frame 101 of the portable terminal.

The pressure sheet 120 includes a sheet 121 attached to a lower surface of the keypad unit 110 and having elasticity and a protrusion 122 protruding from a lower portion of the sheet 121 to press a dome switch 132 and a pressure sensor 143 (to be described below). The sheet 121 and the protrusion 122 may be formed in an integral manner. When the second button key unit 113 is pressed, only a specific protrusion of the integral pressure sheet 120 performs an effective pressing operation.

The dome sheet 130 includes a film 131 attached to the board 140 and the metallic dome switch 132 attached to a proper position of the film 131.

The board 140 includes a contact pattern 142 to which the dome switch 132 is electrically in contact by being pressed and a pressure sensor 143 formed adjacent to the contact pattern. Further, the board 140 can have a Light Emitting Diode (LED) (notg shown) disposed in a proper position to increase readability of the keypad unit 110. In this case, the film 131 may expose the LED. The keypad unit 110 and the pressure sheet 120 may be entirely or partially formed of a semi-transparent or transparent medium. The board 140 may be either a typical Printed Circuit Board (PCB) or a side Flexible PCB (FPCB) disposed in a lateral portion of the body.

In particular, the pressure sensor 143 is not disposed in a lower portion of the dome switch. Instead, the pressure sensor 143 is disposed adjacent to a specific contact pattern so that at least one or more specific pressure sensors are simultaneously pressed when any one of the keys is pressed. For example, the first button key unit 112 becomes eccentric due to an integrated type, if a "right" direction key is pressed, a protrusion corresponding to the "right" direction key presses a corresponding dome switch. As a result of the eccentric of the first button key unit 112, adjacent two protrusions also press corresponding pressure sensors. In this case, in a state where the "right" direction key is pressed and thus the specific dome switch is brought in contact with the specific contact pattern, a corresponding pressure sensor can be further pressed due to elasticity of the protrusion 122 or the sheet 121 of the pressure sheet 120 and tolerance between respective elements. That is, the key assembly 100 according to the exemplary embodiment of the present invention including keypad unit 110 incorporates integrated-type first key 112 and pressure sheet 120 attached to the lower surface of the keypad unit 100 as an actuator for pressing the corresponding dome switch and the corresponding pressure sensor at the same time. Occasionally, instead of the pressure sheet 120, a protrusion for pressing the dome switch and the pressure sensor may be directly formed on the lower surface of the keypad unit 110. Alternatively, instead of the pressure sheet 120, a bridge including a non-elastic bar having designed length and protrusions for pressing may be used as to simultaneously press the dome switch and corresponding pressure sensor. The non-elastic bar may have a length corresponding to a separation distance between the dome switch and the pressure sensor.

Although the buttons 112 are labeled left, right, up and down, it would be recognized that these buttons are position essentially orthogonal to each other and, thus, may also referred to as East, West, North and South. Other labels may also be used to refer to these orthogonal based key buttons. Thus, the labels illustrated are not necessarily associated with the position of the button. Thus, the position of the buttons may be represented by the points of a compass or the hands of clock. In addition, although the buttons 112 are shown in at the cardinal points of a compass, East, West, North and South, it would be recognized that the buttons may also be positioned off the cardinal points, i.e., Northeast, Southeast, Southwest and Northwest, without altering the scope of the invention.

FIG. 3 is a flowchart illustrating a key operation of a key assembly of FIG. 2.

Referring now to FIG. 3, the processing hardware of the portable terminal 10 operates the predetermined method of FIG. 3 determines whether a dome switch is in contact with a contact pattern of a Printed Circuit Board (PCB) in step 301.

If the processing hardware operating the predetermined method determines, in step 301, that the dome switch is in contact with the contact pattern, then the processing hardware operating the predetermined method at step 302 determines whether a valid time period has expired in which the dome switch has remained in a contact state.

If the processing hardware operating the predetermined method determines in step 302 that the valid time is not over, that is, if the contact between the dome switch and the contact pattern is released before the valid time is over, proceeding to step 307, the processing hardware operating the predetermined method determines that the dome switch is contact with the contact pattern. If the processing hardware operating the predetermined method determines in step 307 that the contact is released, the processing hardware operating the predetermined method proceeds to step 303, and the processing hardware operating the predetermined method performs a first operation, and then the procedure of FIG. 3 ends. Otherwise, if the contact is still maintained, the processing hardware operating the predetermined method returns to step 302.

The first operation depends on an input signal generated in a process in which the dome switch is released from the contact pattern after being brought in contact thereto. The first operation may be moving or scrolling of a displayed cursor, menu, screen, and the like. That is, the first operation may be one-time moving or scrolling of the cursor, menu, screen, and the like during a specific time period.

In addition, if the processing hardware operating the predetermined method determines in step 302 that the contact time is longer than the valid time period, processing proceeds to step 304 where the processing hardware operating the predetermined method performs a second operation corresponding to a pressure change sensed by the simultaneously pressed pressure sensors as described above. The second operation may be a scrolling operation having a variable speed depending on the pressure change sensed by the pressure sensor. However, the second operation is not limited thereto in the present invention. Thus, the second operation may be an operation in which the first operation is continuously repeated with a variable speed depending on the pressure variation sensed by the pressure sensors simultaneously pressed.

In step 305, the processing hardware operating the predetermined method determines whether a release of the contact between the dome switch and the contact pattern has occurred while the second operation is being performed. If the processing hardware operating the predetermined method determines in step 305 that the contact is released, that is, the relevant pressure sensor is released, the processing hardware operating the predetermined method finishes the second operation in step 306. Otherwise, if the contact is still maintained, the second operation of step 304 is performed.

For example, when a user depresses a corresponding key button, a corresponding dome switch and a pressure sensor are simultaneously pressed. Conversely, when a user releases the corresponding key button, the corresponding dome switch and the corresponding pressure sensor is released together. The processing hardware operating the predetermined method determines signals of the corresponding dome switch and the corresponding pressure sensor. Then, the processing hardware operating the predetermined method follows the procedure of FIG. 3 as described above. The first operation may be one-time moving or scrolling operation of cursor, menu, screen and the like. More specifically, the first operation may be a moving or a scrolling operation of the cursor, menu, screen, and the like in up, down, left, and right directions as described above. The second operation may continuously be scrolling at a variable speed depending on a pressure value of the simultaneously pressed pressure sensor until the corresponding dome switch and the corresponding pressure sensor are released. More particularly, the second operation may be moving or scrolling of the cursor, menu, screen, and the like in an oblique direction such as a right-down direction, a right-up direction, etc. Then, the corresponding dome switch is released, that is, the corresponding pressure sensor is released, in which case the second operation is stopped and terminated.

In particular, since the first key button unit 112 is an integral type, if two adjacent protrusions are pressed according to a pressure produced when a "right" direction key is pressed, the two adjacent protrusions press the respective pressure sensors about the pressed "right" direction key. As shown in FIG. 2, pressure sensors and protrusions adjacent to the "right" direction key are disposed symmetrically upwards and downwards about the "right" direction key. In this case, according to a pressure difference value between the pressure sensors disposed symmetrically upwards and downwards about the "right" direction key, a direction of moving or scrolling the cursor, menu, and screen with a corresponding speed can be determined to be a right direction or a right-up direction or a right-down direction.

For example, if a pressure difference between up and down pressure sensors simultaneously pressed after the "right" direction key is pressed is within a predetermined range, the cursor, menu, screen, and the like can be moved or scrolled in a right direction as in the original operation of the "right" direction key. Otherwise, if the pressure difference between the up and down pressure sensors simultaneously pressed after the "right" direction key is pressed is beyond the predetermined range, the cursor, menu, screen, and the like can be moved or scrolled in a right-up direction or a right-down direction corresponding to a pressure sensor having a relatively large pressure value. A speed of moving or scrolling the cursor, menu, screen, and the like in the right-up direction or the right-down direction may be in proportion to a pressure value of the pressure sensor or a pressure difference between the pressure sensors. Other key operations of the key assembly 100 according to the embodiment of the present invention will be described below with reference to FIG. 4.

FIG. 4 is a flowchart illustrating another key operation of a key assembly of FIG. 2.

Referring now to FIG. 4, the controller processing hardware operating the predetermined method determines whether a dome switch is in contact with a contact pattern of a PCB in step 401.

If the processing hardware operating the predetermined method determines in step 401 that the dome switch is in contact with the contact pattern, the processing hardware operating the predetermined method determines, at step 402, whether a pressure difference between pressure sensors simultaneously pressed is beyond a predetermined reference range.

If the processing hardware operating the predetermined method determines in step 402 that the pressure difference between the pressure sensors is within a predetermined reference range, the processing hardware operating the predetermined method performs, at step 403, a first operation. The first operation may be a moving or a scrolling of a cursor, menu, screen, and the like depending on a process in which the dome switch is released from the contact pattern after being brought in contact with the contact pattern. That is, the first operation may be one-time moving or scrolling operation of the cursor, menu, screen, and the like. More specifically, the first operation may be a moving or a scrolling operation of the cursor, menu, screen, and the like in up, down, left, and right directions as described above.

In step 404, the processing hardware operating the predetermined method determines whether the contact of the dome switch is released. After completion of the first operation in step 405, the procedure of FIG. 4 ends.

If the processing hardware operating the predetermined method determines in step 402 that the pressure difference between the pressure sensors is beyond the predetermined reference range, the processing hardware operating the predetermined method performs, at step 406, a second operation corresponding to a pressure sensor having a pressure difference greater than the predetermined reference range. The second operation may be scrolling with a variable speed depending on a pressure value of the pressure sensor having a relatively large pressure or a pressure difference between the pressure sensors being greater than a predetermined range. The present invention is not limited thereto, and thus the second operation may be an operation in which the first operation is continuously repeated with the variable speed depending on the pressure change between the pressure sensors simultaneously pressed. More particularly, the second operation may be moving or scrolling of the cursor, menu, screen, and the like in an oblique direction such as a right-down direction, a right-up direction, etc.

In step 407, the processing hardware operating the predetermined method determines whether the contact of the dome switch is released and completes the second operation in step 408, when the contact has been released. Processing then proceeds to end.

The key assembly 100 according to the embodiment of the present invention is brought into contact with a specific contact pattern when a corresponding dome switch is pressed by pressing a specific key. At the same time, a pressure sensor adjacent to the contact pattern is also pressed indirectly by a mechanical means. Further, the key assembly 100 according to the embodiment of the present invention can change a pressure that can be sensed by pressure sensor where the dome switch is pressed.

Figure 5:
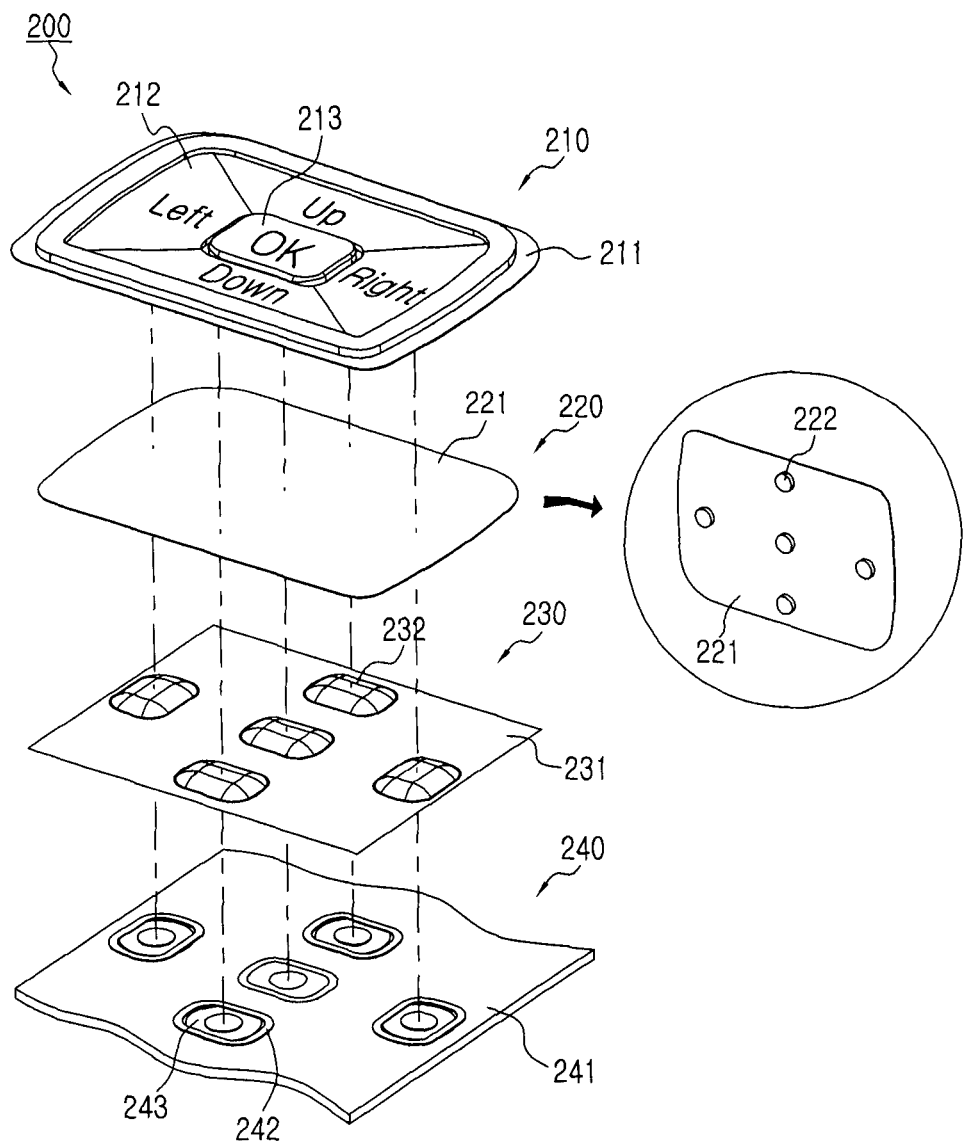
FIG. 5 is an exploded perspective view illustrating a key assembly according to another exemplary embodiment of the present invention.

FIG. 5 is an exploded perspective view illustrating a key assembly according to another exemplary embodiment of the present invention.

Referring now to FIG. 5, a key assembly 200 includes a keypad unit 210, a pressure sheet 220, a dome sheet 230, and a board 240.

The keypad unit 210 is supported by a case frame (or body) of a portable terminal (not shown) and defines an outer surface. The keypad unit 210 includes a plurality of keys. According to the embodiment of the present invention, the keypad unit 210 includes an integrated-type first key button unit 212 and a second key button unit 213 separated from the first key button unit 212. For example, as shown in FIG. 5, the first key button unit 212 is a direction key indicating up, down, right, and left directions, and the second key button unit 213 is a selection key surrounded by the direction key. In addition, the keypad unit 210 includes a separation-preventing flange 211 that prevents keys from separating from the case frame of the portable terminal. The first key button unit 212 may have separate up, down, left, and right direction keys.

The pressure sheet 220 includes a sheet 221 attached to a lower surface of the keypad unit 210 and having elasticity and a protrusion 222 protruding from a lower portion of the sheet 221 to press a dome switch 232 and a pressure sensor 243 (to be described below). The sheet 221 and the protrusion 222 may be formed in an integral manner. When the second button key unit 213 is pressed, only a specific protrusion of the integral pressure sheet 220 performs an effective pressing operation.

The dome sheet 230 includes a film 231 attached to the board 240 and the metallic dome switch 232 attached to a proper position of the film 231.

The board 240 includes a contact pattern 242 to which the dome switch 232 is electrically in contact when pressed and the pressure sensor 243 which is in contact or overlapping with the contact pattern 242. Therefore, the dome switch 232 directly presses the pressure sensor 243 while in contact with the contact pattern 242. The board 240 may be either a typical PCB or a side FPCB disposed in a lateral portion of the body.

For example, if a "right" direction key is pressed, a protrusion corresponding to the "right" direction key presses a corresponding dome switch, and the pressed dome switch directly presses the corresponding pressure sensor while in contact with the contact pattern of the board 240. In this case, if the user further presses the "right" direction key, the pressure sensor can be further pressed due to elasticity of the protrusion 222 or the sheet 221 of the pressure sheet 220 and tolerance between respective constitutional elements.

That is, the key assembly 200 according to another embodiment of the present invention may change pressure that can be sensed by the pressure sensor in a state when the corresponding dome switch is pressed and thus bought in contact with a corresponding contact pattern.

Further, the board 240 can have a Light Emitting Diode (LED) (not shown) disposed in a proper position to increase readability of the keypad unit 210. In this case, the film 231 may expose the LED. The keypad unit 210 and the pressure sheet 220 may be entirely or partially formed of a semi-transparent or transparent medium.

A key operation of the key assembly 200 according to another exemplary embodiment of the present invention is the same as in the process shown in the flowchart of FIG. 3, and thus detailed descriptions thereof will be omitted.

Consequently, the method and device of input for a portable terminal according to exemplary embodiments of the present invention can provide a user with a mechanical click feel and perform various functions corresponding to a key signal depending on a pressure change.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer is loaded with, or accesses, code that may be stored in a memory component, the general purpose computer is transformed into a special purpose computer suitable for at least executing and implementing the processing shown herein.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. An input method for use in a portable terminal comprising a controller and a keypad unit, the keypad unit including a switch and a pressure sensor arranged to be actuated by a key button, the method comprising:
    detecting that a signal is generated by the switch when the key button is actuated;
    performing a first operation based on the signal when the generation of the signal stops before a time period has expired; and
    performing a second operation based on a pressure change sensed by the pressure sensor when the generation of the signal continues after the time period has expired.

2. The input method of claim 1, wherein the second operation is repetitively performed with a variable speed, the variable speed depending on the pressure change sensed by the pressure sensor.

3. The input method of claim 1, wherein the first operation includes a one-time moving operation of a displayed object or a scrolling operation of the displayed object in a selected direction.

4. The input method of claim 3, wherein the second operation includes a continuous moving operation of the displayed object or a continuous scrolling operation of the displayed object in the selected direction, the moving operation or the scrolling operation being performed with a variable speed that is based on the pressure change sensed by the pressure sensor.

5. An electronic device comprising:
    a keypad unit including a switch and a pressure sensor arranged to be actuated by a key button; and
    a controller configured to:
    detect that a signal is generated by the switch when the key button is actuated;
    perform a first operation based on the signal when the generation of the signal stops before a time period has expired; and
    perform a second operation based on a pressure change sensed by the pressure sensor when the generation of the signal continues after the time period has expired.

6. The electronic device of claim 5, wherein the second operation is repetitively performed with a variable speed, the variable speed depending on the pressure change sensed by the pressure sensor.

7. The electronic device of claim 5, wherein the first operation includes a one-time moving operation of a displayed object or a scrolling operation of the displayed object in a selected direction.

8. The electronic device of claim 7, wherein the second operation includes a continuous moving operation of the displayed object or a continuous scrolling operation of the displayed object in the selected direction, the moving operation or the scrolling operation being performed with a variable speed that is based on the pressure change sensed by the pressure sensor.

* * * * *